(12) United States Patent
Eigemann et al.

(10) Patent No.: US 8,090,631 B2
(45) Date of Patent: Jan. 3, 2012

(54) MANAGING A MATERIAL BATCH

(75) Inventors: Sven-Eric Eigemann, Sandhausen (DE);
Stefan Elfner, Heidelberg (DE);
Juergen Wettengl, Wettenberg (DE)

(73) Assignee: SAP Aktiengesellschaft, Walldorf (DE)

( * ) Notice: Subject to any disclaimer, the term of this patent is extended or adjusted under 35 U.S.C. 154(b) by 1926 days.

(21) Appl. No.: 10/895,025

(22) Filed: Jul. 20, 2004

(65) Prior Publication Data
US 2005/0261992 A1    Nov. 24, 2005

Related U.S. Application Data

(60) Provisional application No. 60/566,720, filed on Apr. 30, 2004.

(51) Int. Cl.
*G06Q 10/00* (2006.01)
*A01K 5/02* (2006.01)
*G06F 17/00* (2006.01)
*G06K 15/00* (2006.01)

(52) U.S. Cl. ............. 705/28; 705/29; 235/376; 235/383
(58) Field of Classification Search .................... 705/16, 705/28, 29; 235/375, 383; 340/572
See application file for complete search history.

(56) References Cited

U.S. PATENT DOCUMENTS

| | | | |
|---|---|---|---|
| 4,525,071 A * | 6/1985 | Horowitz et al. | 366/141 |
| 5,478,990 A * | 12/1995 | Montanari et al. | 235/375 |
| 6,097,995 A * | 8/2000 | Tipton et al. | 700/266 |
| 6,100,804 A * | 8/2000 | Brady et al. | 340/572.7 |
| 6,549,891 B1 * | 4/2003 | Rauber et al. | 705/28 |
| 6,724,308 B2 * | 4/2004 | Nicholson | 340/572.1 |
| 7,205,016 B2 * | 4/2007 | Garwood | 426/108 |
| 7,571,166 B1 * | 8/2009 | Davies et al. | 707/10 |
| 2001/0030232 A1 * | 10/2001 | Piatek | 235/375 |
| 2002/0004749 A1 * | 1/2002 | Froseth et al. | 705/16 |
| 2003/0125972 A1 * | 7/2003 | Luce et al. | 705/1 |
| 2003/0213844 A1 * | 11/2003 | Yoshida et al. | 235/383 |
| 2005/0237201 A1 * | 10/2005 | Nedblake | 340/572.8 |
| 2005/0261991 A1 * | 11/2005 | Kennamer | 705/28 |

OTHER PUBLICATIONS

"Inventory Management" downloaded at http://help.sap.com/saphelp_470/helpdata/en/12/085d6a470311d1894a0000e823352 on Jul. 19, 2004, 2 pages.

* cited by examiner

*Primary Examiner* — Ryan Zeender
*Assistant Examiner* — Dana Amsdell
(74) *Attorney, Agent, or Firm* — Fish & Richardson P.C.

(57) ABSTRACT

Inventory may be managed by affixing to material batches respective documentary batch numbers that are associated with the material batches in a computer system. The material batches may be placed as inventory in a warehouse. The documentary batch number of any of the material batches that is removed from the warehouse may be registered, wherein the documentary batch numbers are not used in managing the inventory. A material batch may be managed by affixing to the material batch a documentary batch number that is associated with the material batch in a computer system. Upon a predetermined action being taken with regard to the material batch, the documentary batch number may be received in the computer system. The documentary batch number may be read from the material batch, wherein any action taken with regard to the material batch before receiving the documentary batch number upon the predetermined action is not tracked.

14 Claims, 4 Drawing Sheets

US 8,090,631 B2

MANAGING A MATERIAL BATCH

CROSS-REFERENCE TO RELATED APPLICATION

This application claims benefit of U.S. Provisional Application No. 60/566,720, filed Apr. 30, 2004, and entitled "Batchless Inventory Management".

TECHNICAL FIELD

This description relates to managing a material batch.

BACKGROUND

Manufacturers may choose to track batches during a production process for several reasons. Typically, these reasons involve a need or desire to be able to trace the ingredients or components that have been used in a shipped product, or to be able to trace the product(s) made from a specific ingredient or component. A need for traceability may be imposed by legal requirements, for example in the pharmaceutical industry where drugs can be made up of several different chemicals or compositions. Another example is customer demands: someone purchasing a composite product may insist that its constituent parts or ingredients be traceable. Yet another example is that a manufacturer may itself impose a quality requirement on its operations to ensure reliable products and to protect its goodwill.

One existing system that provides this kind of traceability is known as "Inventory Management" and is available from SAP AG in Walldorf (Baden), Germany. This system tracks batch number(s) of materials that are used in manufacturing a product. It is therefore suitable for the manufacture of pharmaceutical products, for example. Particularly, it provides a "where-used" list for batches, which list facilitates tracing for purposes of recalling products and other reasons. That is, the actions taken with regard to a material batch are tracked and associated with its particular batch number.

This system and other existing solutions may however be associated with problems. The rigorous tracking of batch numbers for every action taken with regard to the material may not be necessary (from a legal standpoint) or even desirable (from a cost perspective) in other implementations. Particularly, managing the material stock in batches requires substantial information processing and data entry by users. Car makers and food producers, to name just two examples, may want to ensure traceability in their respective manufacturing processes without this complexity. Such producers have therefore been reluctant to adopt the above described inventory management solution.

SUMMARY

The invention relates to managing a material batch. In a first general aspect, a method comprises affixing to a material batch a documentary batch number that is associated with the material batch in a computer system. Upon a predetermined action being taken with regard to the material batch, the documentary batch number is received in the computer system. The documentary batch number is read from the material batch. Any action taken with regard to the material batch before receiving the documentary batch number upon the predetermined action is not tracked.

In a second general aspect, a method comprises affixing to material batches respective documentary batch numbers that are associated with the material batches in a computer system. The material batches are placed as inventory in a warehouse. The documentary batch number of any of the material batches that is removed from the warehouse is registered. The documentary batch numbers are not used in managing the inventory.

Advantages of the systems and techniques described herein may include any or all of the following: Providing batchless inventory management; providing that partial stocks of a material are traceable without having to manage the material stock in batches; reducing complexity in an inventory management system; decreasing the amount of data that is recorded when managing material batches; reducing the amount of data that users must enter into the system; and lowering costs of inventory management.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
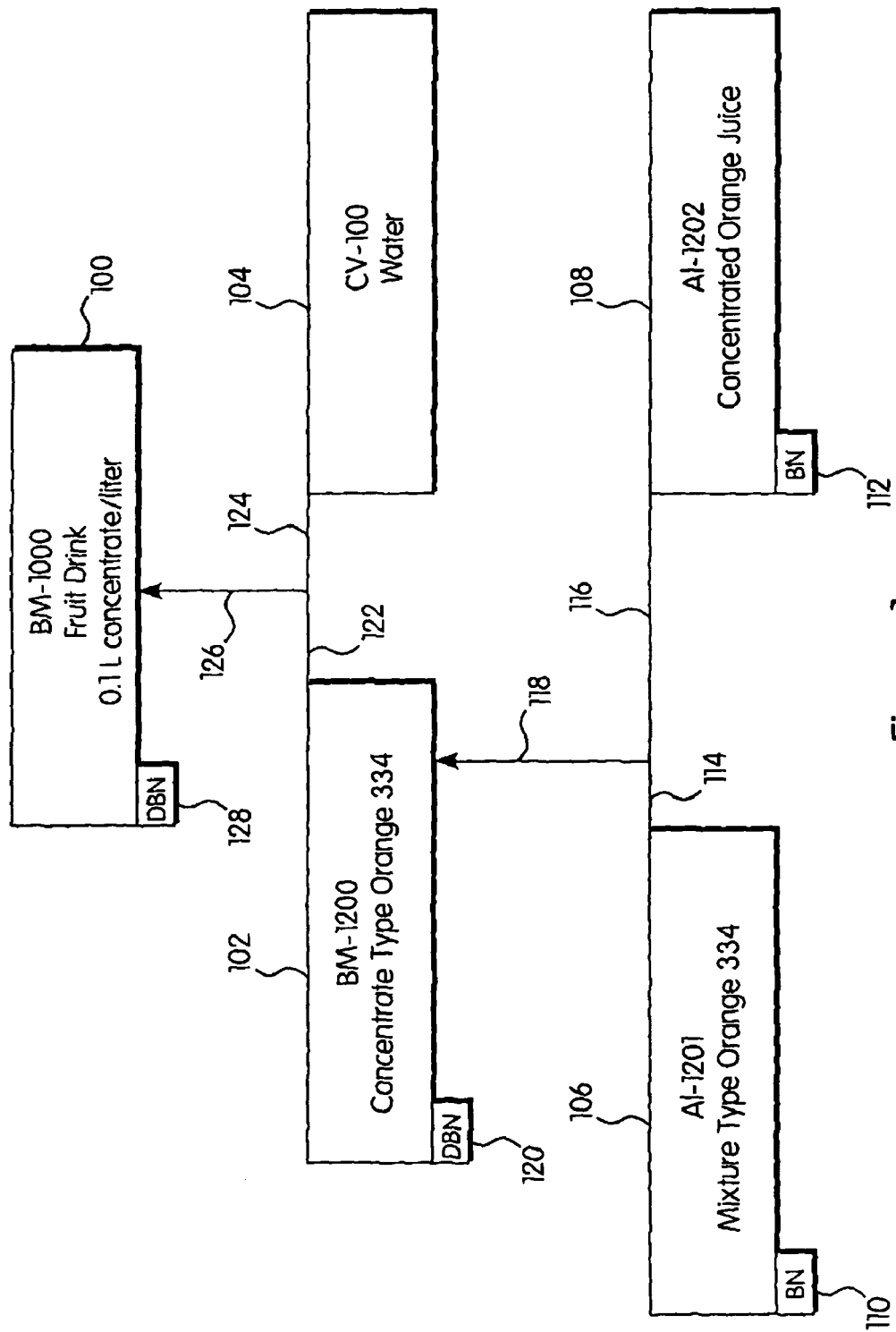
FIG. 1 schematically shows a product being manufactured through a sequential combination of materials.

This description will be based on an example of manufacturing a fruit drink product in a manufacturing plant. FIG. 1 schematically shows how fruit drink 100 is made by combining a Concentrate Type Orange (CTO) 102 with water 104. The respective materials may have material names in the manufacturing plant, such as BM-1000 for the fruit drink 100, BM-1200 for the CTO 102 and CV_100 for water. The CTO 102, in turn, is a combination of a Mixture Type Orange (MTO) 106 and Concentrated Orange Juice (COJ) 108. The MTO 106 may have a material number Al-1201 and the COJ 108 a material number Al-1202, respectively. There may exist a bill of materials (BOM) that lists these ingredients of the fruit drink 100. The manufacturing plant includes a computer system that will later be described, and this system may include the BOM, among other electronic documents.

The exemplary manufacturing process may begin with generating a production order for the CTO 102 in the system. The purpose of the production order is to produce the CTO 102 that can be used as an ingredient in the fruit drink 100, among other products. The production order may include a list of the ingredients or materials that are part of the CTO 102, and the required quantities of each. This list may be copied from a recipe or from the BOM. The system may output the production order to indicate that there is a need for the listed ingredients. This may trigger the process of determining whether the needed ingredients are available in storage or whether they must be restocked.

The ingredients, here the MTO 106 and the COJ 108, may be associated with batch numbers (BN) in the manufacturing plant. Particularly, the system may manage the stock of these materials in batches, meaning that the system tracks the acquisition, storage, relocation and consumption of these materials, to name a few examples, and records this information it in association with their respective BNs. Thus, the MTO 106 may be associated with a BN 110 and the COJ 108 may be associated with a BN 112. These BNs may be assigned by the system or may be provided by a supplier of the materials.

Assume that the warehouse includes sufficient quantities of the MTO and COJ for producing the CTO 102. The requested amounts of these ingredients will then be taken from the warehouse. This is schematically illustrated in FIG. 1 by the line 114 for the MTO 106 and the line 116 for the COJ 108. Each or both of the lines 114 and 116 may correspond to a "goods issue" document in the system. That is, there may be generated in the system a goods issue document that refers to the production order for the CTO 102 and that indicates the taken quantity of the material and the location where it was obtained. The goods issue also may contain the BN for the respective materials.

The retrieved materials are mixed using suitable equipment to form the CTO 102. This is schematically illustrated in FIG. 1 by an arrow 118 leading from the junction of the lines 114 and 116 to the CTO 102. The arrow 118 may correspond to a "goods receipt" document in the system. That is, there may be generated in the system a goods receipt document that refers to the production order for the CTO 102 and that indicates the produced quantity of the CTO 102.

The goods receipt also may include a documentary batch number (DBN) for the produced CTO 102. The DBN may be associated with the specifics of how the material was produced (such as the date, time and production line), and indicates that the stock of the produced material will not be managed in batches. However, use of the DBN does allow tracing of some or all of the material batch with which the DBN is associated. The goods receipt may state the location of the produced material, which may be in the warehouse if the material is to be held for some time, or a subsequent production level if the production process is ongoing.

Thus, the CTO 102 may be associated with a DBN 120. The DBN 120 may be physically affixed to the container or receptacle holding the material, or to a pallet on which the material sits, to name a few examples. For example, the DBN 120 is printed on a label that is affixed as a sticker. As another example, the DBN 120 is encoded in a radiofrequency identifier (RFID) tag that is programmed and detected using existing technology.

The system may propose the DBN 120 upon the CTO 102 being manufactured. That is, the system may generate the DBN 120, create the corresponding label, and the label may then automatically or manually be applied to the material. The system associates the generated DBN with the goods receipt for the produced material.

As another example, a supply of labels may be provided with pre-generated DBNs. When a material is manufactured, then, a label containing one of the pre-generated DBNs may be applied to it. Upon affixing the label, the pre-generated DBN may be read and entered into the system, such as by manual entry or by an automatic scanning of a label or RFID tag. The system associates the selected pre-generated DBN with the goods receipt for the produced material.

While the CTO 102 is in the warehouse, it may be subject to relocations and other actions that do not affect material composition. That is, these acts regarding the CTO 102 do no change the fact that it was made by mixing the MTO 106 having a BN 110 with the COJ 108 having a BN 112. These relocations and other actions are therefore not recorded in association with the DBN 120. This reduces the complexity of the inventory management system and eliminates some user input during these actions.

Assume now that a production order for the fruit drink 100 is created in the system. This initiates the process of manufacturing the fruit drink from its ingredients. The production order may list the materials from which the fruit drink is made. This information may be copied from a recipe or from the BOM. Here, the fruit drink 100 consists of the CTO 102 mixed with water. In this exemplary manufacturing plant, water is supplied by pipeline and therefore not associated with any batch number. It is noted that the fruit drink production order may require only part of the amount of the CTO 102 that was manufactured in the steps described above.

The requested quantity of the CTO 102 is removed from the warehouse as schematically indicated by the line 122. The line 122 may correspond to a goods issue document for the removed material. The goods issue may refer to the production order for the fruit drink and may list the quantity and location of the removed material. Particularly, the goods issue includes the DBN 120 for the retrieved material. The DBN may be entered by a user or may be automatically read from the label on the material.

Water is now drawn from the pipeline as indicated by the line 124. The water is mixed with the retrieved CTO 102 using suitable equipment as schematically illustrated by an arrow 126 leading from the junction of the lines 122 and 124 to the fruit drink 100. The arrow 126 may correspond to a goods receipt document in the system for the fruit drink. The goods receipt document may refer to the production order for the fruit drink 100 and may indicate the produced quantity of the fruit drink.

The goods receipt includes a DBN 128 that is associated with the produced fruit drink. The DBN 128 may be system-proposed or selected among pre-generated DBNs as described above. The DBN 128 may be the same as, or different from, the DBN 120 that is associated with the CTO 102. Moreover, multiple units of the fruit drink 102 could be associated with different DBNs, for example reflecting differences in the date, time or production line of their manufacture. The goods receipt may include a location for the produced fruit drink, such as in the warehouse if it is not to be immediately shipped to a customer.

Assume now that a sales order for the fruit drink is entered in the system. The sales order includes a delivery date for the product and creates a demand in the system for the corresponding quantity of fruit drink. In response, the system makes a reservation for that amount and creates a delivery document that represents the shipping of the ordered product.

When the product is to be shipped, the required amount of fruit drink (such as 10 liters) is removed from the warehouse. The DBN or DBNs of the removed product are received in the system, for example by user entry or automatic label reading. Thus, the system registers that a particular stock of the fruit drink 100, here associated with the DBN 128, is shipped to a particular customer at a specific time. Thus, the DBN can be used for tracing the ingredients that went into the shipped product or, conversely, tracing the shipped product based on its ingredients, without having to manage the product stock in batches.

Figure 2:
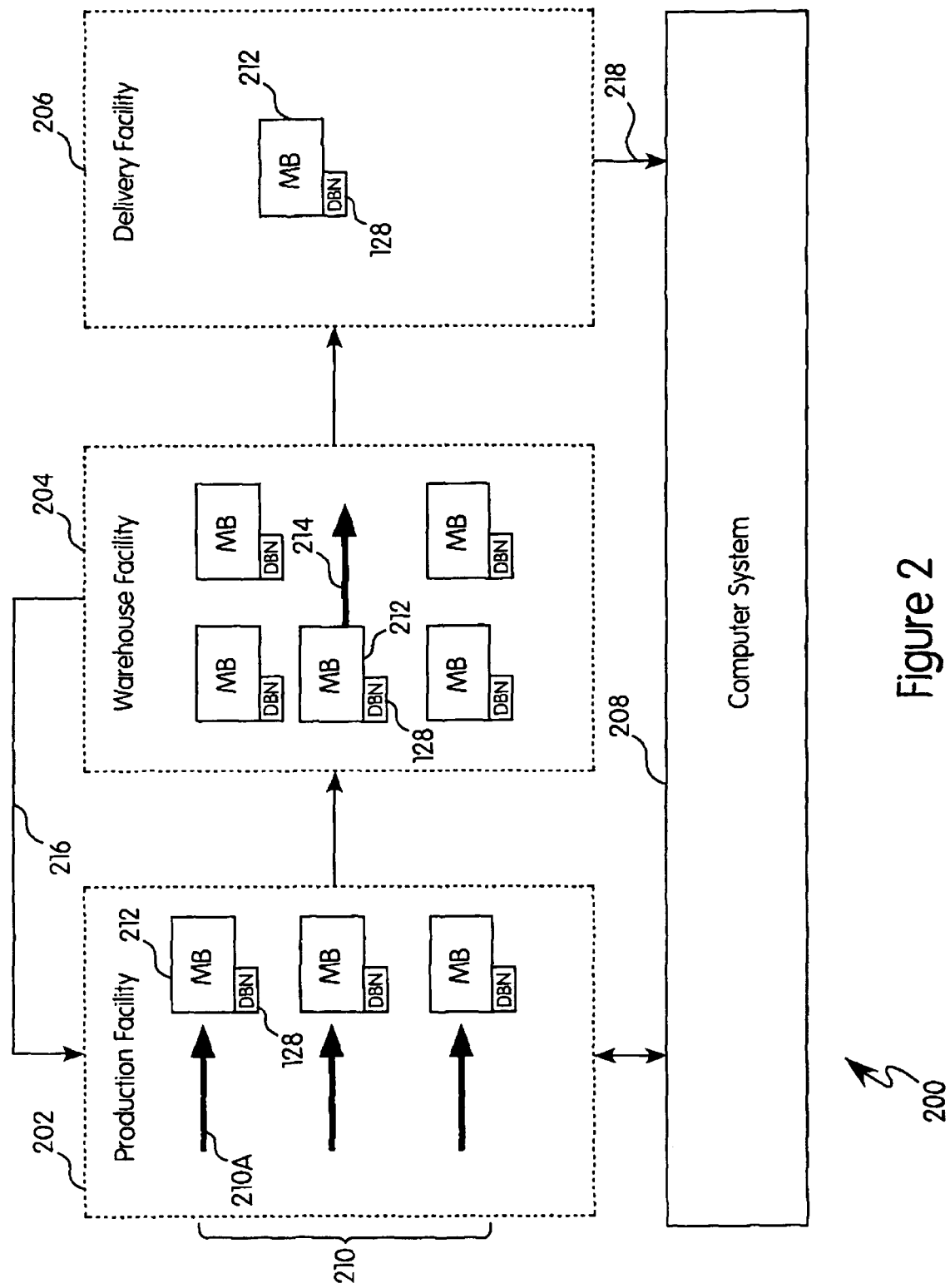
FIG. 2 schematically shows materials and products at several stages of a manufacturing plant.

FIG. 2 schematically illustrates a manufacturing plant 200 where the above described operations, among others, can be performed. The plant 200 includes a production facility (PF) 202, a warehouse facility (WF) 204 and a delivery facility (DF) 206. A computer system 208 may oversee and manage the operations in these facilities. This may involve the system 208 interacting with local computer systems in the facilities.

For example, the WF 204 may have a computer system that manages the receipt, storage and removal of material stocks, as will be described below.

The PF 202 may include one or more separate production lines 210. Here, the output of the production lines 210 is generally referred to as material batches (MB). For example, the fruit drink 100 may correspond to a MB 212 that is produced in a production line 210A. The MB 212 is associated with the DBN 128 as described above. That is, a label or other marker bearing the DBN may be applied to the MB upon it being produced. The DBN may be associated in the system 208 with the date and time that the MB 212 was manufactured, and with the production line 210A. For example, the DBN may consist of these information portions in any order.

After production, the MB 212 may be transferred to the WF 204 where several or many other MBs may be located. This transfer may be documented by the goods receipt. The WF 204 may operate according to any existing warehousing principle, such as a first-in-first-out (FIFO) technique wherein the oldest stocks of a given material are retrieved before the newer stocks. Thus, the WF 204 may track the order in which the MBs are received. However, the WF 204 may be configured such that material stocks are not managed in batches. That is, relocation or other activities are not tracked in association with the DBNs. For example, the system 208 may be unaware that the MB 212 is subject to a relocation 214 in the WF 204. The FIFO system, in contrast, is not aware of the DBN or DBNs that are associated with the material batches.

Materials in the WF 204 may be used in further manufacturing processes, as schematically illustrated by an arrow 216. That is, a material that is needed for making a composition may be brought from the WF 204 to the PF 202 and there be mixed with another ingredient. For example, the CTO 102 was obtained from the warehouse in the example described above.

When a product is to be shipped, it may be brought from the WF 204 to the DF 206. This may be documented by the delivery document. Upon retrieving the MB 212, its DBN 128 is received in the system 208 as indicated by the arrow 218, for example by user entry or automatic label reading. The system registers that the DBN 128 is delivered to a particular customer on a specific day, and the fruit drink corresponding to the MB 212 is shipped from the plant 200.

Thus, if the product turns out to be defective, the DBN 128 can provide tracing of its ingredients. This may be done using the delivery document, the goods receipt for the fruit drink 100, the goods issue for the CTO 102, the goods receipt for the CTO 102, and the goods issue documents for the ingredients. Accordingly, information that does not affect the material composition of the product is not recorded in association with the DBN.

Figure 3:
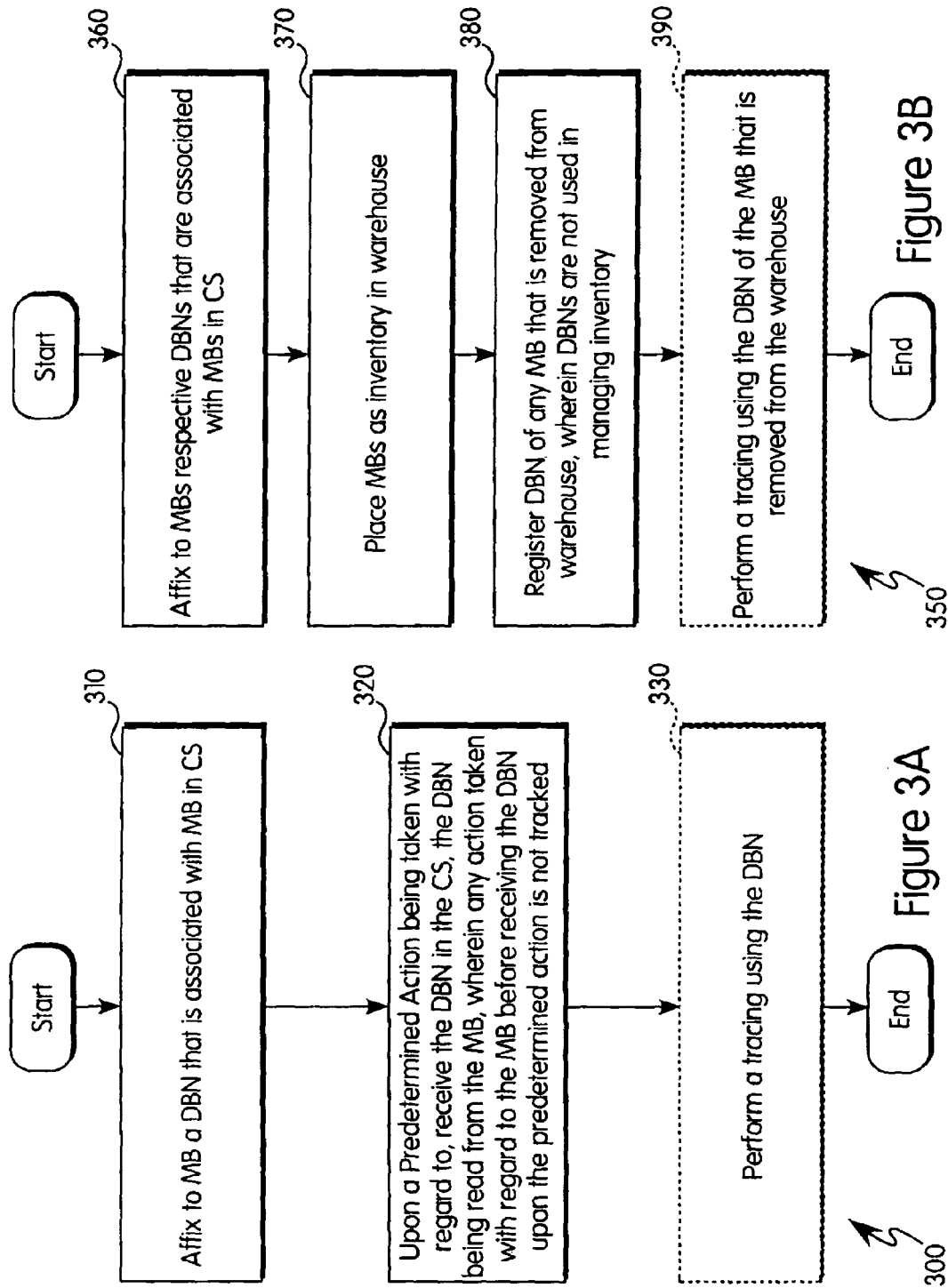
FIGS. 3A and 3B are flow charts of embodiments of inventive methods.

FIGS. 3A and 3B are flow charts of methods 300 and 350, respectively. The method 300 may be performed in the system 200. For example, a computer program product may include instructions that cause a processor to perform operations comprising the steps of the method 300. The method 300 includes the following steps:

Affixing to a material batch, in step 310, a documentary batch number that is associated with the material batch in a computer system. For example, the DBN 128 is associated with the MB 212 in the computer system 208 and may be affixed to the fruit drink upon its production.

Upon a predetermined action being taken with regard to the material batch, receiving, in step 320, the documentary batch number in the computer system. The documentary batch number is read from the material batch, wherein any action taken with regard to the material batch before receiving the documentary batch number upon the predetermined action is not tracked. For example, the predetermined action may include removing the MB 212 from the WF 204 to the DF 206. The system 208 may receive the DBN 128 upon user entry or upon it being automatically read from the MB 212. Warehouse relocations of the MB 212 before the delivery are not tracked.

Performing, in optional step 330, a tracing using the documentary batch number. For example, if the fruit drink 100 is found to be defective, its ingredients can be traced using the DBN 128. As another example, if the MTO 106 or the COJ 108 are found to be defective, the fruit drink 100 in which they were used can be traced.

The method 350 may be performed in the system 200. For example, a computer program product may include instructions that cause a processor to perform operations comprising the steps of the method 350. The method 350 includes the following steps:

Affixing, in step 360, to material batches respective documentary batch numbers that are associated with the material batches in a computer system. For example, DBN associated with MBs can be affixed to them upon them being manufactured in any of the production lines 210.

Placing, in step 370, the material batches as inventory in a warehouse. For example, the MBs with affixed DBNs can be brought from the PF 202 to the WF 204 for storage.

Registering, in step 380, the documentary batch number of any of the material batches that is removed from the warehouse, wherein the documentary batch numbers are not used in managing the inventory. For example, the system 208 can register the DBN 128 of the MB 212 upon it being brought from the WF 204 to the DF 206. The DBN 128 may be registered through user entry or automatic reading, to name just two examples. The system 208 does not track the relocation 214 in association with the DBN 128.

Performing, in optional step 390, a tracing using the documentary batch number of the material batch that is removed from the warehouse. For example, the ingredients of a defective product, or the product(s) in which a defective ingredient is used, can be traced using the DBN 128.

Figure 4:
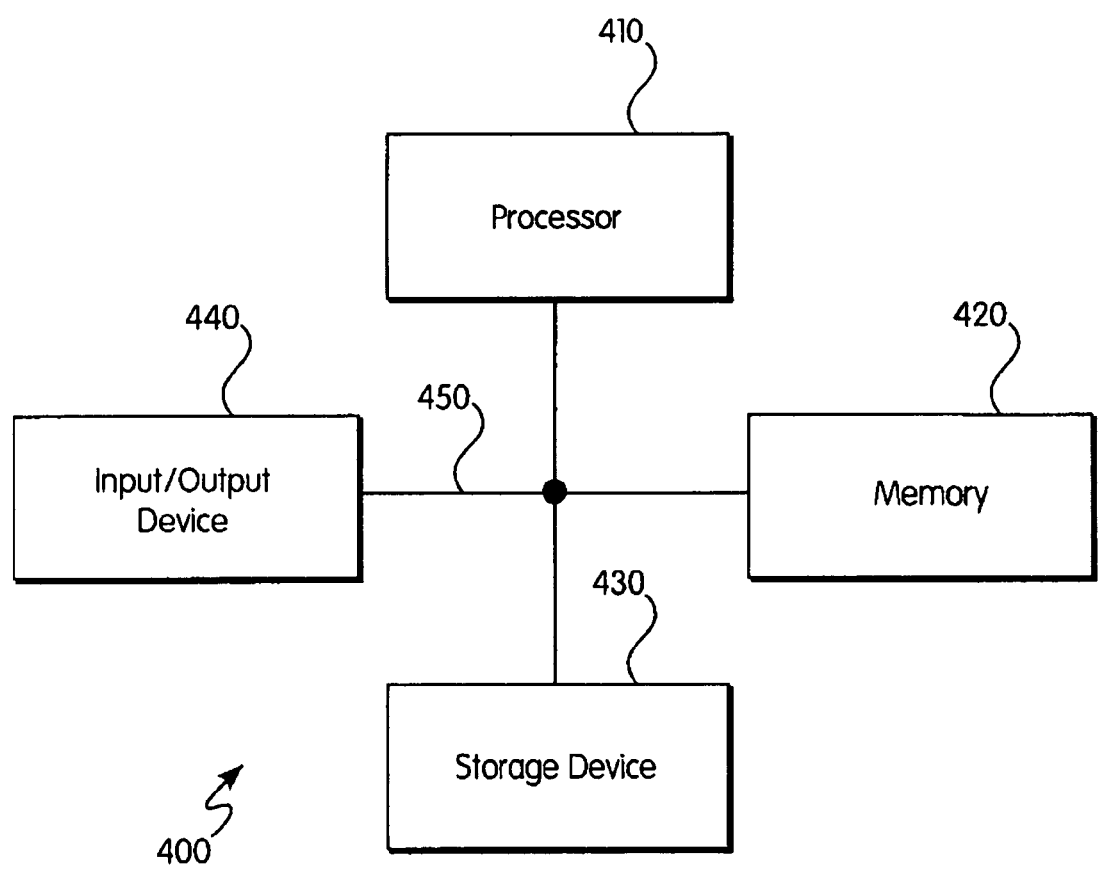
FIG. 4 shows a block diagram of a general computer system.

FIG. 4 is a block diagram of a computer system 400 that can be used in the operations described above, according to one embodiment. The system 400 includes a processor 410, a memory 420, a storage device 430 and an input/output device 440. Each of the components 410, 420, 430 and 440 are interconnected using a system bus 450. The processor 410 is capable of processing instructions for execution within the system 400. In one embodiment, the processor 410 is a single-threaded processor. In another embodiment, the processor 410 is a multi-threaded processor. The processor 410 is capable of processing instructions stored in the memory 420 or on the storage device 430 to display graphical information for a user interface on the input/output device 440.

The memory 420 stores information within the system 400. In one embodiment, the memory 420 is a computer-readable medium. In one embodiment, the memory 420 is a volatile memory unit. In another embodiment, the memory 420 is a non-volatile memory unit.

The storage device 430 is capable of providing mass storage for the system 400. In one embodiment, the storage device 430 is a computer-readable medium. In various different embodiments, the storage device 430 may be a floppy disk device, a hard disk device, an optical disk device, or a tape device.

The input/output device 440 provides input/output operations for the system 400. In one embodiment, the input/output device 440 includes a keyboard and/or pointing device. In some embodiments, the input/output device 440 includes a display unit for displaying graphical user interfaces.

For example, the system 400 may be incorporated in the computer system 208. That is, the DBN or DBNs may be generated by the processor 410 executing suitable instructions stored in the memory 420 or in the storage device 430. A generated DBN may be printed on a label, or programmed into an RFID tag, using the input/output device 440. The system 400 may receive the DBN for a MB using the input/output device 440, for example through user entry or automatic reading. The input/output device 440 also may display to a user a BOM, production order, goods issue, goods receipt or a delivery document at various stages of the production process.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method of managing a material batch, the method comprising:
    physically affixing to a material batch a documentary batch number that is associated with the material batch in a computer system, the documentary batch number allowing a tracing of at least one ingredient in the material batch;
    placing the material batch with the affixed documentary batch number in inventory; and
    in response to the material batch being removed from the inventory for delivery, reading the documentary batch number from the material batch for receipt in the computer system,
    wherein management of the material batch in the inventory taken before reading the documentary batch number is not tracked by the computer system, so that the material batch is indistinguishable in the computer system from other material batches in the inventory before the documentary batch number is read, and so that the material batch is distinguished from the other material batches after the documentary batch number is read,
    wherein the computer system records only information that affects material composition of the material batch in association with the documentary batch number.

2. The method of claim 1, wherein non-tracked actions include movement of the material batch in a warehouse.

3. The method of claim 1, wherein the computer system proposes the documentary batch number and generates a label bearing the documentary batch number that is affixed to the material batch.

4. The method of claim 1, wherein a label bearing the documentary batch number is affixed to the material batch, and wherein the documentary batch number is read from the label into the computer system to associate the documentary batch number with the material batch.

5. The method of claim 4, wherein the label is obtained from a group of labels bearing pre-generated documentary batch numbers.

6. The method of claim 1, further comprising performing a tracing using the documentary batch number.

7. The method of claim 6, wherein the tracing includes determining at least one material from which the material batch is manufactured.

8. The method of claim 6, wherein the tracing includes determining at least one material that is manufactured from the material batch.

9. The method of claim 1, wherein the material batch includes at least one selected from the group consisting of: a product, a material, a mixture, and combinations thereof.

10. The method of claim 1, wherein several material batches are associated with the documentary batch number.

11. A computer program product tangibly embodied in a computer-readable storage device, the computer program product including instructions that, when executed, cause a processor to perform operations comprising:

associate in a computer system a documentary batch number with a material batch, the documentary batch number being affixed to the material batch, the documentary batch number allowing a tracing of at least one ingredient in the material batch; the material batch being placed with the affixed documentary batch number in inventory; and in response to the material batch being removed from the inventory for delivery, reading the documentary batch number from the material batch for receipt in the computer system, wherein management of the material batch in the inventory taken before reading the documentary batch number is not tracked by the computer system, so that the material batch is indistinguishable in the computer system from other material batches in the inventory before the documentary batch number is read, and so that the material batch is distinguished from the other material batches after the documentary batch number is read, wherein the computer system records only information that affects material composition of the material batch in association with the documentary batch number.

12. The computer program product of claim 11, wherein several material batches are associated with the documentary batch number.

13. A system comprising:
a programmable processor; and
a computer-readable storage device coupled to the processor and having instructions stored therein that, when executed, cause the processor to perform operations comprising:

associate in a computer system a documentary batch number with a material batch, the documentary batch number being affixed to the material batch, the documentary batch number allowing a tracing of at least one ingredient in the material batch; the material batch being placed with the affixed documentary batch number in inventory; and in response to the material batch being removed from the inventory for delivery, reading the documentary batch number from the material batch for receipt in the computer system, wherein management of the material batch in the inventory taken before reading the documentary batch number is not tracked by the computer system, so that the material batch is indistinguishable in the computer system from other material batches in the inventory before the documentary batch number is read, and so that the material batch is distinguished from the other material batches after the documentary batch number is read, wherein the computer system records only information that affects material composition of the material batch in association with the documentary batch number.

14. The system of claim 13, wherein several material batches are associated with the documentary batch number.

* * * * *